3,265,699
PROCESS FOR PRODUCING LINEAR QUINACRIDONES OF SMALL PARTICLE SIZE
Edward E. Jaffe, Union, N.J., assignor to E. I. du Pont de Nemours and Company, Wilmington, Del., a corporation of Delaware
No Drawing. Filed Jan. 9, 1962, Ser. No. 165,234
1 Claim. (Cl. 260—279)

This invention relates to a method for producing pigments of high tinctorial strength and small particle size.

It is well known that a number of organic pigments can be processed to a small particle size by a procedure commonly known as "acid pasting." In such a procedure, it is the usual practice to stir a pigment, such as copper phthalocyanine, with sufficient concentrated $H_2SO_4$ to form a solution. The original pigment is then regenerated by dilution with water, usually by pouring the acid solution into a large volume of water, whereupon the pigment precipitates in a small particle size.

It is an object of the present invention to modify the technique of "acid pasting" so that pigments of improved tinctorial strength are obtained. In the broadest aspect of this invention, a pigment is regenerated from solution in a strong acid by dilution of the solution with a lower aliphatic alcohol. It has been found that this dilution with an alcohol rather than water gives an unexpected improvement in the tinctorial strength of the pigment. Any pigment that will dissolve in a strong acid without decomposition may be processed according to this invention. The dissolving of such pigments is a result of a reaction between the pigment and the acid to form a salt which is soluble in the excess acid present. Examples of pigments that may be treated by this invention are copper phthalocyanine, monochloro copper phthalocyanine, the corresponding phthalocyanines of other metals such as nickel, cobalt, and chromium, linear quinacridone and the various substituted derivatives thereof, isoquinacridone, quinacridone-quinone, angular quinacridone, the substituted derivatives of these compounds, and also flavanthrone and indanthrone.

The strong acids that may be used to dissolve the pigments are well known, and they include polyphosphoric acid, sulfuric acid, chlorosulfonic acid, and the like. In general, any acid which will dissolve the pigment without causing its decomposition is suitable.

The choice of alcohol is largely one of convenience. Usually, water-soluble alcohols are used since they can be easily removed from the pigment. Both methanol and ethanol are preferred, the latter being either anhydrous or in one of the readily available denatured forms (such as Formula 2B, ethanol denatured with a small amount of benzene). The alcohol may contain water, but the alcohol content of such mixtures should be at least 60%. Therefore, when the concentration of the alcohol is specified in the ensuing specification or claims, it is in terms of the concentration of the alcohol in water.

The process of this invention is particularly applicable to the treatment of linear quinacridone. Whereas prior art acid pasting of linear quinacridone always resulted in the production of the alpha crystal phase (see U.S. Patent 2,844,484), the process of the present invention makes it possible to produce quinacridone in the beta as well as the gamma phase. For example, linear quinacridone may be dissolved in 3–10 parts of polyphosphoric acid per part of pigment by heating at 70–150° C. The pigment may then be regenerated in the gamma phase by the slow addition of several volumes of pure methanol, followed by digesting at an elevated temperature, preferably under reflux for at least an hour. When a pigment subjected to this treatment is recovered by conventional washing, filtration, and drying, a gamma phase quinacridone of high tinctorial strength and good intensity of hue is obtained. To produce the violet shade beta phase, it is necessary only to increase the rate of regeneration of the quinacridone. This may be accomplished by the partial dilution of the alcohol with water or by rapid addition of the alcohol to the solution.

Another aspect of this invention involves the synthesis of a quinacridone or a related compound such as an isoquinacridone in polyphosphoric acid, following which the quinacridone or related compound is precipitated by the addition of alcohol. The synthesis is carried out by heating a diarylaminobenzene dicarboxylic acid or a lower alkyl ester thereof in polyphosphoric acid, thus causing cyclization of the dicarboxylic acid. Cyclization of diarylaminobenzene dicarboxylic acids in polyphosphoric acid and the like is well known, and it is described in French Patent 1,264,481 and Belgian Patent 585,921. The temperatures used to effect the cyclization are usually above 120° C. and below the decomposition temperature of the compound being produced. A preferred temperature range is 140–150° C. The time of heating will vary considerably with the temperature employed. However, heating periods in the range of 1–2 hours in most instances are sufficient to effect cyclization. Usually, about 3–10 parts of polyphosphoric acid are used per part of diarylaminobenzene dicarboxylic acid. The diarylamino terephthalic acids and esters are preferred materials, especially 2,5-dianilino terephthalic acid. Other dicarboxylic acids and esters that may be used in this invention are those disclosed in Belgian Patent 585,921. Examples of the dicarboxylic acid compounds that can be cyclized include 2,5-dianilinoterephthalic acid, 2,4-dianilinoisophthalic acid and their derivatives, wherein the anilino residues are substituted with halogen, alkyl, alkoxy groups, and the like. Also such compounds as 2,5-dinaphthylaminoterephthalic acid can be used. With respect to the choice of the dicarboxylic acid compound, it is only necessary that there be a free position on the pendant aromatic ring ortho to the amino group so that cyclization can take place. If this process of cyclization is followed by the addition of alcohol to the acid solution, a pigment of high tinctorial strength and good intensity of hue is obtained. In the case of quinacridone, the crystal phase of the material obtained can be controlled by the procedures heretofore described.

The following examples illustrate the invention in greater detail, the term "parts" referring to parts by weight unless otherwise designated. The "polyphosphoric acid," used in these examples, is a commercial product containing the equivalent of about 82%–84% $P_2O_5$. These examples are intended to be merely illustrative of the invention and not in limitation thereof.

*Example I*

6 parts of crude beta phase quinacridone is added to 60 parts of polyphosphoric acid. The mixture is heated with agitation to 70–80° C. and kept at that temperature for about 1.5 hours until solution is complete. After cooling to about 45–50° C., 200 parts of ethanol (95% purity) is added over a period of about 1.25 hours while agitation is continued and temperature is maintained at 40–50° C. It is then heated to the boil and maintained under reflux for 1 hour, cooled, filtered and washed acid free with water. The product exhibits the typical X-ray diffraction pattern of a gamma phase quinacridone, as described in U.S. Patent 2,844,541. However, it has higher tinctorial strength, yellow tint, and a darker, more transparent masstone than typical products made according to this patent.

Example II 6 parts of crude quinacidone is dissolved in 60 parts of polyphosphoric acid by heating for about 1 hour at 140° C.–150° C. After cooling to about 45° C., 200 parts of ethanol (Formula 2B) is added slowly over a period of 1.5 hours with good agitation throughout. The mixture is then heated to the boil and maintained under reflux for 2.5 hours after which it is cooled, filtered, washed free of soluble salts with water, and dried at 50° C.–80° C. The X-ray diffraction pattern of the resulting product indicates that it is a mixture of beta and gamma phases with the gamma phase predominating. The tinctorial properties are those of a predominantly gamma phase product showing a high tinctorial strength and a hue only slightly bluer than a characteristic pure gamma phase product.

Example III

A solution of 6 parts quinacridone in 60 parts polyphosphoric acid is prepared by heating at 70–80° C., as in Example I. It is then cooled to 45° C., the agitation stopped, and 200 parts of denatured ethanol (Formula 2B) is added as rapidly as possible. The agitator is then started, the mixture heated to the boil and maintained under reflux for about 1¾ hours. It is then cooled, filtered, washed free of acid with water, and dried. The product exhibits the typical X-ray diffraction pattern of beta phase quinacridone, as described in U.S. Patent 2,884,485. However, it is bluer and stronger than typical products made according to this patent.

Example IV 6 parts of crude quinacridone is dissolved in 60 parts of polyphosphoric acid by heating at 140° C.–150° C. for 1.5–2 hours and then cooled to 40° C., after which a mixture of 140 parts ethanol (Formula 2B) and 75 parts of water is added rapidly without agitation. Then, with the agitator running, the slurry is heated to the boil and maintained under reflux for about 2.5 hours. It is cooled, filtered, and washed free of acid with water, and dried to give a product which is predominantly a beta phase quinacridone and is bluer and stronger than the product of Example III with a darker, more transparent masstone.

Example V

This example tabulates the results of variations applied to the process of Example IV, both as to temperature at the point of regeneration and as to ratio of water to alcohol. In each case, 6 parts of crude quinacridone is dissolved in 60 parts polyphosphoric acid at 140° C.–150° C., the mixtures cooled to the indicated temperatures and the alcohol solutions of indicated composition added rapidly, after which the slurries are stirred under reflux for about 2.5 hours, cooled, filtered, washed, and dried. The results are as follows:

| Sample | Temp., °C. | Ethanol | Water | Resulting Phase | Tinctorial Properties vs. Example IV | |
|---|---|---|---|---|---|---|
| | | | | | Masstone | Hue |
| A | 40 | 160 | 50 | beta | light | about equal. |
| B | 40 | 170 | 37.5 | do | do | Do. |
| C | 75 | 140 | 75 | do | dark | slightly less blue. |
| D | 75 | 160 | 50 | do | do | Do. |
| E | 80 | 120 | 100 | do | do | less blue. |
| F | 80 | 186 | 17.5 | do | do | Do. |

Higher temperatures favor dark masstones; lower temperatures favor blueness in hue.

Example VI

In a further variation of Example IV, the ratio of quinacridone to polyphosphoric acid may be varied as shown in the following table. Except for a slight increase in the alcohol used with the higher ratios of quinacridone, the procedure used is identical with that of Example IV.

| | Quinacridone | Polyphosphoric Acid | Ethanol | Water |
|---|---|---|---|---|
| A | 12 | 60 | 196 | 75 |
| B | 15 | 60 | 196 | 75 |

Products isolated from these procedures are intense violet pigments showing X-ray diffraction patterns characteristic of predominantly beta phase quinacridone.

Example VII

A well-stirred mixture of 10 parts 2,5-dianilinoterephthalic acid and 100 parts polyphosphoric acid is heated to 140° C. in about 1 hour, maintained at that temperature for about 1.5 hours and subsequently cooled to 60° C. With continuing agitation, 80 parts methanol is added over a period of about 50 minutes with the temperature at 55–60° C. When the methanol is all in, the charge is heated to the boil and maintained under reflux for about 2 hours and filtered. It is reslurried in 120 parts methanol, boiled again under reflux for 2 hours, filtered, washed free of acid with water, and dried at 80° C. to give a product which is identified by its X-ray diffraction pattern as a gamma phase quinacridone. It is stronger, more intense, and has a more transparent masstone than typical gamma phase quinacridones of the prior art.

In a variation of this procedure, a larger charge, a mixture of 60 parts dianilinoterephthalic acid and 600 parts polyphosphoric acid is heated to 140 °C.–150° C. in 1 hour, held at this temperature for 1.5 hours, and cooled to 60° C., whereupon 320 parts of methanol is added in about 15 minutes and the mixture stirred for one hour at 110–125° C., cooled to 60° C.–70° C. and furthere diluted with 650 parts of methanol added in 15 minutes, after which it is heated to the boil and maintained under reflux for 2.5 hours, filtered, washed acid free with water, and dried to give a product which exhibits the typical X-ray diffraction pattern of pure gamma phase quinacridone.

Example VIII 6 parts 2,5-dianilinoterephthalic acid is added to 60 parts polyphosphoric acid, the mixture heated at 140° C.–150° C. as in Example VII, and then cooled to about 45° C. With the temperature held between 45° C.–50° C., 18 parts of water is added dropwise over 7–10 minutes to precipitate the phosphate salt of quinacridone without appreciable hydrolysis. Stirring is continued for about 30 minutes and 200 parts ethanol (Formula 2B) is added all at once. Then, while again stirring, the charge is heated to the boil and maintained under reflux for 1.5 hours, cooled, filtered, washed acid free with water, and dried to give a very blue-shade, high-strength quinacridone pigment with a relatively transparent masstone, exhibiting an X-ray diffraction pattern which is predominantly that of a beta phase quinacridone.

Example IX

The ratio of polyphosphoric acid to dianilinoterephthalic acid can be considerably lower than the 10:1 ratio shown in Examples VII and VIII above. The following table summarizes the experience with various ratios, the heating cycle being otherwise like that shown in Example VII. At the end of the heating cycle, the charge is cooled to about 60° C., methanol as shown in the table is slowly added to the mixture which is then heated to the boil and stirred under reflux for about 2 hours. After again cooling to 60° C.–70° C., about 500 parts of methanol is added, the charge boiled under reflux for about 2 hours, filtered, washed acid free with water, and dried to give, in each case, a product which is an intense red pigment showing an X-ray diffraction pattern of a predominantly gamma phase quinacridone.

| Dianilino-terephthalic Acid | Polyphosphoric Acid | Methanol Added |
|---|---|---|
| 60 | 600 | 1,000 |
| 120 | 600 | 1,600 |
| 150 | 600 | 2,400 |
| 198 | 600 | 3,200 |

*Example X*

The principles of this invention also apply when mixtures of diarylaminoterephthalic acids are cyclized in polyphosphoric acid. For example, 6 parts of 2,5-dianilinoterephthalic acid and 4 parts of 2,5-bis(o-chloroanilino) terephthalic acid are added to 100 parts polyphosphoric acid, the mixture heated to 140° C. in one hour, and held at 140° C.–150° C. for 1.5 hours. After cooling to 60° C., 160 parts methanol is added in 40 minutes, the mixture heated to the boil and maintained under reflux for 3.5 hours. It is filtered, washed acid free, reslurried in a 10% aqueous solution of sodium hydroxide, boiled a short time, and filtered again. After washing free of soluble salts, it is dried at 60° C. to give 8.5 parts of a yellow-shade red pigment of high tinctorial strength which exhibits a characteristic X-ray diffraction pattern different from those recognized for any of the known crystal forms of either quinacridone or 4,11-dichloroquinacridone.

*Example XI*

7.5 parts of 2,5-dianilinoterephthalic acid and 3.6 parts of quinacridonequinone (which may be obtained in known manner by cyclizing 2,5-bis(o-carboxyanilino)benzoquinone) are added to 100 parts polyphosphoric acid, the mixture is heated to 140° C. in one hour and held at 140° C.–150° C. for 1.5 hours. After cooling to about 60° C., 160 parts of methanol is added slowly, the mixture heated to the boil and maintained under reflux for about 2 hours, filtered, washed acid free, and dried at 60° C. to give a yellow-shade maroon pigment of excellent lightfastness, and unusually high tinctorial strength. It contains about 65% quinacridone and about 35% quinacridonequinone in solid solution, as evidenced by a characteristic X-ray pattern which is different from that to be expected from a physical mixture of the components.

*Example XII*

6 parts 2,5-dianilinoterephthalic acid and 4 parts 2,5-bis(p-toluidino)terephthalic acid are added to 100 parts polyphosphoric acid. The mixture is heated to 140° C. over a period of about 2 hours, held at 140° C. for about 1.5 hours, and cooled to 60° C., after which a mixture of 50 parts methanol and 40 parts of water is added slowly. The slurry is heated to the boil under reflux for 1.5 hours, filtered and reslurried in 75 parts methanol plus 60 parts of water, followed by a further heating under reflux for about 2 hours. It is finally filtered, washed acid free with water, dried to give a pigment of high tinctorial strength and magenta hue. It exhibits a characteristic X-ray diffraction pattern different from that to be expected from a physical mixture of 60% quinacridone and 40% 2,9-dimethylquinacridone and the two components are believed to be present in solid solution with each other.

*Example XIII*

10 parts of 2,5-bis(p-toluilino)terephthalic acid is added to 100 parts polyphosphoric acid and heated to 140° C. in about one hour. After stirring at 140° C.–150° C. for about 1.5 hours, the mixture is cooled to about 60° C. and diluted with a mixture of 200 parts methanol and 50 parts water. It is then heated to the boil and boiled under reflux for about 2 hours, after which it is filtered, washed acid free with water and dried at 60° C. to give 2,9-dimethylquinacridone, a very blue-shade red pigment (sometimes called magenta shade) of high tinctorial strength and intensity and showing good lightfastness.

*Example XIV*

10 parts of 4,6-dianilinoisophthalic acid and 100 parts polyphosphoric acid are heated together to 140° C. in about one hour and held at 140° C.–150° C. for about 1.5 hours. After cooling to about 60° C., 200 parts methanol is added slowly (10–15 minutes) and the mixture heated to the boil and boiled under reflux for one hour. It is then filtered, washed free of acid, and dried at 60° C. to give 9.5 parts of yellow pigment, of high tinctorial strength, which is identified as isoquinacridone.

*Example XV*

10 parts crude quinacridone pigment is added to 100 parts 96% $H_2SO_4$ at about 10° C. and stirred at 10° C. until solution is complete. This solution at 10° C. is poured rapidly into 800 parts of methanol at 20° C., the mixture is stirred for about one hour at about 20° C. and then filtered, washed acid free with water, and dried. The resulting quinacridone pigment is predominantly in the gamma phase, and shows much higher tinctorial strength and improved intensity compared to the product obtained when a similar solution in sulfuric acid is hydrolyzed in water alone.

*Example XVI*

10 parts of crude copper phthalocyanine is dissolved in 100 parts of polyphosphoric acid by heating at 150° C. for 1.5 hours. After cooling to 60° C., 160 parts methanol is added slowly and the charge heated at the boil under reflux for 2 hours. It is filtered, reslurried in 120 parts methanol and again heated under reflux for 2 hours and finally filtered, washed acid free with water and dried to give a red-shade copper phthalocyanine pigment of good tinctorial strength.

In the process of regeneration of a pigment from a solution in an acid, the acid salt of the pigment is chemically converted to the free pigment. When this reaction is done under the influence of water, as practiced in the prior art, it is known as "hydrolysis" and is usually very rapid with little opportunity for equilibrium to be established between solution and crystal phases. In the new process of this invention, an alcoholic solvent is used in place of water and the process, which may be called "solvolysis," is less rapid with more opportunity for equilibrium between phases to be established. The speed of the regeneration reaction in such processes is considered to be a major factor in controlling the crystal phase of the pigment resulting from the regeneration step, if such pigment is capable of existing in more than one crystal phase. Considering the case of unsubstituted linear quinacridone, when water is used, as in the prior art, the very rapid reaction invariably yields the alpha phase (described in U.S. Patent 2,844,484) which tends to be less stable than the more desirable gamma phase (described in U.S. Patent 2,844,541) of a similar hue. At the other extreme, the use of anhydrous alcohol added slowly to the acid solution results in slow solvolysis and yields the most stable phase, the gamma phase. To obtain an intermediate rate of "solvolysis," resulting in beta phase quinacridone (described in U.S. Patent 2,844,485), one may resort to various techniques such as a very rapid addition of the alcohol, dilution of the alcohol with various amounts of water—up to as much as about 40%, or even the precipitation of the insoluble pigment salt by the cautious dilution with a small amount of water prior to the actual solvolysis.

In general, the three most important variables which influence the results of this invention as it applies to unsubstituted quinacridone are:

(1) The temperature at which regeneration takes place,
(2) The purity of the alcohol,
(3) The rate of addition of alcohol.

Within a reasonable range of about 40° C. to 80° C., the temperature of regeneration is not a major factor in controlling phase but does influence tinctorial properties, higher temperatures favoring darker and more transparent masstones. There is also a tendency, particularly when the beta phase is being prepared, for lower temperatures to favor bluer products.

The purity of the alcohol has a major influence on phase. When there is more than a trace of water present, it is almost impossible to obtain the gamma phase, the products always being predominantly beta phase regardless of the rate of addition or the temperature. On the other hand, substantially anhydrous alcohol may also yield beta phase quinacridone when added rapidly.

Thus, the third variable, rate of addition, is not entirely independent, but slower addition favors the formation of the most stable gamma phase when a pure alcohol is used.

Another factor that appears to affect the results is the history of the acid solution prior to regeneration. When the cyclization is brought about in polyphosphoric acid, the temperature is fixed at about 140° C.–150° C. by that necessary for cyclization. Examples VII and VIII show conversion of such mixtures to the gamma and beta phases, respectively. However, when the starting material is a crude quinacridone, prepared elsewhere, complete solution can be effected at 70° C.–80° C., and it is shown in Example I that slow addition of pure alcohol gives gamma phase, whereas in Example III rapid addition results in beta phase. If, however, the solution of crude quinacridone in polyphosphoric acid is brought about at 140° C.–150° C., it is easy to obtain the beta phase by regenerating with mixtures of alcohol and water but the slow addition of pure alcohol, while favoring the formation of gamma phase, usually permits some beta phase also to form.

In the more general aspects of the invention, as applied to products other than unsubstituted quinacridones and to the use of acids other than polyphosphoric acid, these details are not critical and the use of alcohol regeneration results in high-strength products of easy dispersibility.

The amount of alcohol used in all the examples is large compared to that required to react with the acid and thus decompose the acid salt of the pigment. The only requirement as to amount is that there be such an excess and that there be sufficient dilution to result in easy stirring. The theoretical requirement of methyl alcohol is not more than approximately 60% of the weight of polyphosphoric acid used, whereas most of the examples have used from 1.5 to three times as much alcohol by weight as polyphosphoric acid. In some cases, small amounts of water have supplemented lesser amounts of alcohol. Thus, the minimum of alcohol, or equivalent, is about 60% the weight of polyphosphoric acid used, and a considerable excess over this, preferably in the range of 1.5 to two times the weight of polyphosphoric acid, is desirable for dilution and easy stirring.

All of the examples show digestion at an elevated temperature to complete the "solvolysis." Neither the exact temperature nor time of this step is critical, but it is convenient to heat at the boil under reflux to avoid premature loss of alcohol. The temperature at this boiling point is only slightly higher than the boiling point of the alcohol, in general around 70–80° C. In instances where the quinacridone pigment has been previously prepared and recovered, the heating step may be conducted at temperatures as low as 30° C.–50° C. However, when the pigment is one which has just been cyclized and is still in the polyphosphoric acid, the digestion should be conducted at the boil. If the alcohol is allowed to evaporate, the temperature ultimately rises rapidly and if there is no water present, as when pure alcohol has been used, the higher temperature of digestion favors conversion of unsubstituted quinacridone to the gamma phase. The isolation of the pigment from the slurry in alcohol is entirely conventional. It is conveniently done by filtration, followed by washing on the funnel with water which readily removes the residual alcohol and the by-product phosphoric acid esters along with other water-soluble impurities. The product is finally dried and pulverized in a conventional manner.

Since it is obvious that many changes and modifications can be made in the above-described details without departing from the nature and spirit of the invention, it is to be understood that the invention is not to be limited to said details except as set forth in the appended claim.

The embodiment of the invention in which an exclusive property or privilege is claimed is defined as follows:

In a process for the regeneration of linear quinacridone from its solution in polyphosphoric acid to a pigment in small particle size, the improvement which consists of precipitating the pigment from the acid solution predominantly in the gamma crystal phase by the slow addition of a substantially anhydrous lower alkyl alcohol to said solution, said addition being made in not less than about one-half hour, and subsequently heating at the boil.

References Cited by the Examiner

UNITED STATES PATENTS

| | | | |
|---|---|---|---|
| 2,863,875 | 12/1958 | Bienert et al. | 260—314.5 |
| 3,007,930 | 11/1961 | Manger et al. | 260—279 |
| 3,047,582 | 7/1962 | Bienert et al. | 260—314.5 |
| 3,074,950 | 1/1963 | Deuschel et al. | 260—279 |

FOREIGN PATENTS 1,233,785    5/1960    France.

OTHER REFERENCES

Lubs, Chemistry of Synthetic Dyes and Pigments, pages 594–5 (1955).

HENRY R. JILES, *Acting Primary Examiner.*

IRVING MARCUS, WALTER A. MODANCE,
NICHOLAS S. RIZZO, *Examiners.*

D. M. KERR, JAMES A. PATTEN, DONALD G. DAUS,
*Assistant Examiners.*